Feb. 24, 1925.
J. E. M. COOKE
1,527,173
SOLE FOR BOOTS AND SHOES
Filed Dec. 22, 1923
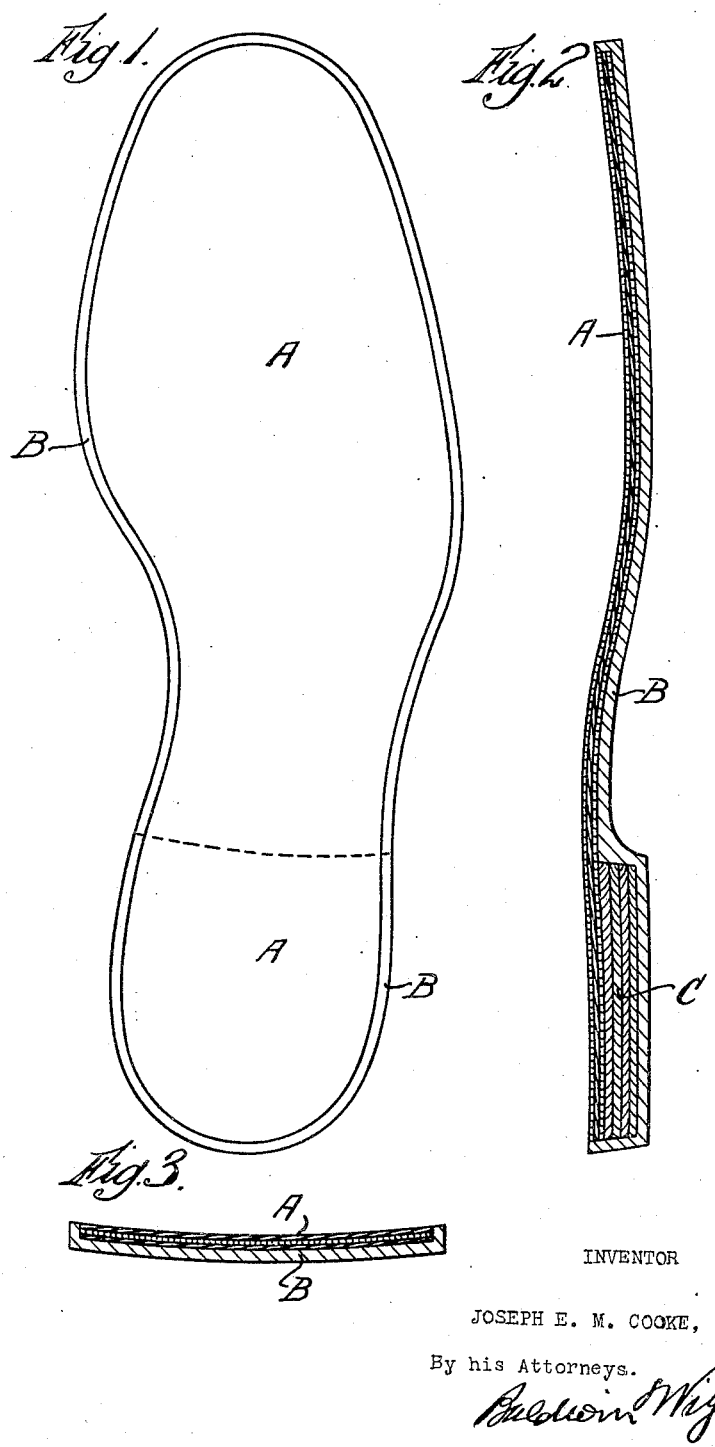
INVENTOR
JOSEPH E. M. COOKE,
By his Attorneys.

Patented Feb. 24, 1925.

1,527,173

UNITED STATES PATENT OFFICE.

JOSEPH EDWIN MARKHAM COOKE, OF RISING BROOK, STAFFORD, ENGLAND.

SOLE FOR BOOTS AND SHOES.

Application filed December 22, 1923. Serial No. 682,188.

*To all whom it may concern:*

Be it known that I, JOSEPH EDWIN MARKHAM COOKE, a subject of the King of Great Britain, residing at 12, Rising Brook, Stafford, England, have invented new and useful Improvements in Soles for Boots and Shoes, of which the following is a specification.

The invention has for its object the production of a very light, durable and cheap sole, which, whilst possessing the desired flexibility, shall be of a sufficient firmness to ensure comfort in wear by protecting the foot against uneven surfaces.

According to my invention I form a sole of a plywood body having a tread of rubber or the like which is moulded and vulcanized on to the body and surrounds it all around its edges or sides.

My invention is illustrated by the accompanying drawing, Figure 1 of which is a plan, Figure 2 a vertical section and Figure 3 a transverse section of a sole formed in accordance therewith.

A is the plywood body which is approximately of the shape of the finished sole but is preferably one-eighth of an inch smaller all round and is about three-fifths the thickness of the finished sole. B is the covering of rubber. C are additional layers of plywood at the seat, that is, the part of the sole to which the heel is attached. In some cases, for example, in children's shoes, these additional layers will be sufficient and no separately made heel will be required.

Preferably the top and bottom layers of the three plywood are arranged with the grain of the wood running across the sole while the middle layer has the grain running from back to front.

The sole is made by placing the rubber or the like in a plastic state in a mould of the shape which the finished sole is to have. The plywood body is then placed in the plastic material, and the mould is subjected to the necessary heat and pressure to cause the material to be vulcanized and take the shape of the finished sole.

Such a sole may be attached to the upper and inner sole of a boot or shoe by glue, solution or the like, or by nails or by both combined.

A sole made in accordance with this invention has the advantage that the various processes known as "finishing" are unnecessary.

What I claim is:—

1. A sole formed of a plywood body having a tread of rubber which surrounds its edges moulded and vulcanized on to it.

2. A sole formed of a three plywood body having moulded and vulcanized on to it a tread of rubber which surrounds its edges, the top and bottom layers of the plywood being arranged with the grain across the sole while the middle layer has its grain lying from back to front of the sole.

3. A sole formed of a plywood body with additional layers of plywood at the heel end and a tread of rubber which surrounds the edges of the body moulded and vulcanized on to the body.

In testimony that I claim the foregoing as my invention I have signed my name this 5th day of December, 1923.

JOSEPH EDWIN MARKHAM COOKE.